UNITED STATES PATENT OFFICE.

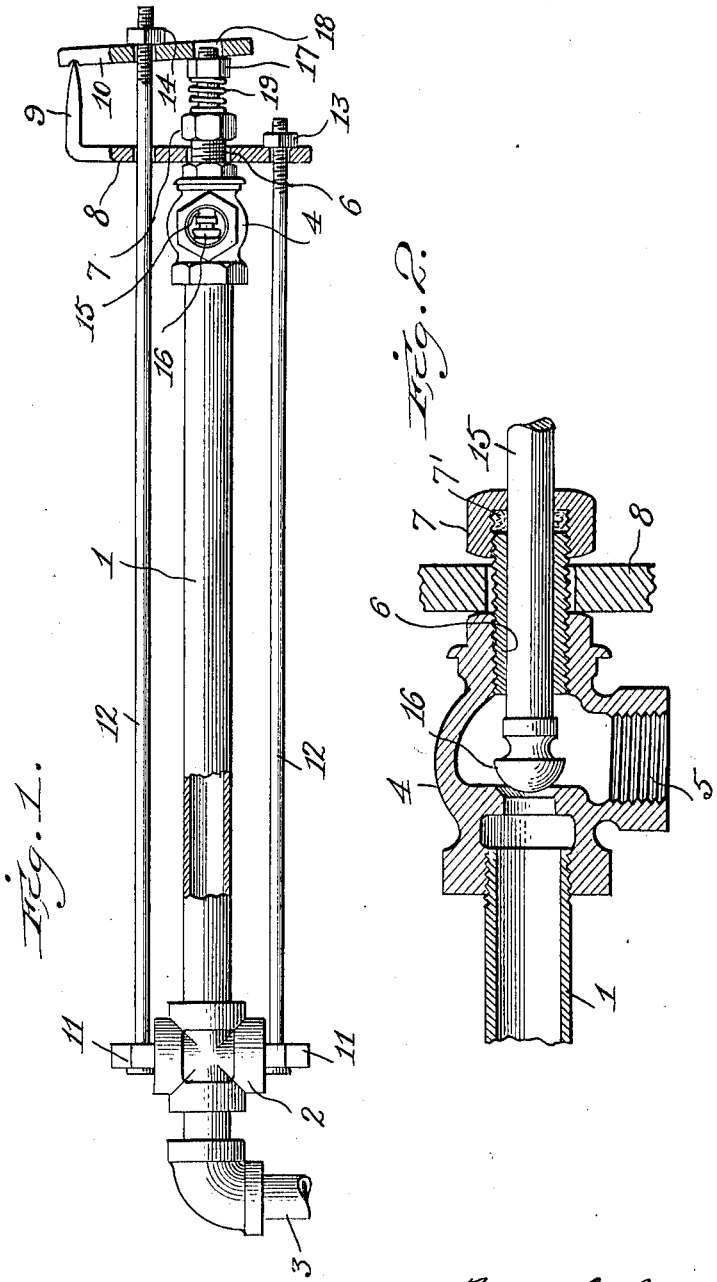

FRANK L. WATSON, OF LYNCHBURG, VIRGINIA.

EXPANSION-TRAP.

1,096,654.  Specification of Letters Patent.  Patented May 12, 1914.

Application filed January 9, 1914. Serial No. 811,243.

*To all whom it may concern:*

Be it known that I, FRANK L. WATSON, a citizen of the United States, residing at Lynchburg, in the county of Campbell and State of Virginia, have invented certain new and useful Improvements in Expansion-Traps; and I do hereby declare the following to be a full, clear, and exact description of the invention, such as will enable others skilled in the art to which it appertains to make and use the same.

My invention relates to relief devices for vapor and other heating systems, commonly known as expansion traps, and embodies certain novel features in the construction of the same, as will be hereinafter more definitely pointed out and claimed, reference being had to the accompanying drawing, in which:

Figure 1 is a side elevation, partly broken away, of my improved expansion trap. Fig. 2 is an enlarged detail sectional view of the valve of the same, taken at a right angle to Fig. 1.

Similar numerals of reference denote corresponding parts in the two views.

In the said drawing the reference numeral 1 denotes a tube, which may be of brass or other expansible metal, and which is threaded at one end into a coupling 2, to which is also connected, in any suitable manner, the end of a pipe 3, which is in communication near the boiler with the return of a vapor heating system. The other end of pipe 1 is threaded into a coupling 4, that has a side relief aperture 5. Said coupling 4 also has threaded thereinto a short pipe section 6, having an apertured cap 7 threaded onto its outer end the two forming a stuffing box 7'. Mounted loosely on the pipe section 6, between the coupling 4 and the cap 7, is a lever 8 having one end 9 bent at an angle and reduced at its end to substantially a knife edge to engage one end of a plate 10. Fixed in oppositely disposed ears 11 on the coupling 2 are two rods 12, disposed parallel with the tube 1, one of which passes through lever 8 and has a nut 13 on its outer end, and the other of which passes free through lever 8 and also through plate 10, and has a nut 14 on its outer end.

Extending through cap 7 and pipe section 6 is a valve stem 15, formed with a valve 16 at its inner end in coupling 4 adapted to seat in coupling 4 to close the end of tube 1, and at its outer end being provided with a nut 17 adapted to contact against the inner face of plate 10, the latter being apertured at 18 to receive freely the outer end of said valve stem 15. A coiled spring 19 interposed on said valve stem 15 between cap 7 and nut 17, tends to retain the valve stem 15 and its valve 16 in unseated position with respect to its seat in coupling 4.

In operation the device normally will remain in the position shown in the drawing with the valve 16 unseated with respect to the end of tube 1, due to the tension of spring 19 acting between cap 7 and nut 17, but when the steam or other heating vapor has filled the system and reaches and fills tube 1, the latter will expand longitudinally under its heat, and as the rods 12 will be substantially unaffected by said heat that end of lever 8 engaged by nut 13 will be held against movement, while the pressure of the end of coupling 4, which is moved longitudinally by the expansion of tube 1, will move correspondingly the other end of lever 8 which carries the bent end 9. This movement will be imparted to the outer end of plate 10, but as the latter is held against movement at its center by the nut 14 on the other rod 12, it will pivot on that point, and its inner end moving inward will, by its contact with the nut 17 on valve stem 15, force the latter inward against the tension of spring 19 and will seat the valve 16 against the end of tube 1, thus preventing further escape of the steam or other vapor, as readily will be understood.

By my improved construction I obtain a quicker response than has been obtained in thermostatic devices of this character heretofore, in that there is a coincident elongation of the tube 1 toward its valve 16 with the movement of said valve toward its seat as described.

While I have shown and described my improved device as particularly adapted for use in the return of vapor systems, it will be understood that it is susceptible of many other uses, such as to drain the ends of low pressure steam mains where the condensation is not returned directly to the boiler, or in connection with drain coils, steam kettles, steam cookers, high pressure headers or any other analogous devices where a thermostatic relief is desired.

Having thus described my invention, what I claim as new and desire to secure by Letters Patent is:

In a relief device for heating systems, a thermostatically extensible tube, rods fixed to the tube support and disposed parallel with said tube, a lever adapted to be operated by the extension of said tube and pivoted to one of said rods, a plate operated by said lever and pivoted to the other of said rods, and a spring retracted valve for said tube operated by said plate toward its closing position with respect to said tube.

In testimony whereof I have hereunto set my hand in the presence of two subscribing witnesses.

FRANK L. WATSON.

Witnesses:
 JULIA J. LAVINDER,
 A. M. BOONE.

---

Copies of this patent may be obtained for five cents each, by addressing the "Commissioner of Patents, Washington, D. C."